United States Patent [19]

Voss et al.

[11] Patent Number: 5,143,421
[45] Date of Patent: Sep. 1, 1992

[54] VEHICLE SEAT HAVING A SEAT SURFACE WHICH IS ADJUSTABLE BOTH AS TO HEIGHT AND INCLINATION

[75] Inventors: Hans W. Voss, Rockenhausen; Heinz P. Cremer, Kaiserslautern; Harald Cwiertnia; Peter-Ulrich Putsch, both of Rockenhausen, all of Fed. Rep. of Germany

[73] Assignee: Keiper Recaro GmbH & Co., Fed. Rep. of Germany

[21] Appl. No.: 607,635

[22] Filed: Oct. 31, 1990

Related U.S. Application Data

[60] Continuation of Ser. No. 337,471, Apr. 13, 1989, abandoned, which is a division of Ser. No. 54,769, May 27, 1987, Pat. No. 4,842,334.

[30] Foreign Application Priority Data

May 27, 1986 [DE] Fed. Rep. of Germany ....... 3617810

[51] Int. Cl.$^5$ .............................................. B60N 2/18
[52] U.S. Cl. .................................. 297/338; 248/421; 297/329; 297/330; 297/339; 297/346
[58] Field of Search ............... 297/338, 339, 346, 347, 297/345, 329, 330; 248/419, 421

[56] References Cited

U.S. PATENT DOCUMENTS

| | | | |
|---|---|---|---|
| 2,827,105 | 3/1958 | Brundage | 297/330 X |
| 2,839,124 | 6/1958 | Desmond. | |
| 2,905,228 | 9/1959 | Latimer | 297/330 X |
| 2,919,744 | 1/1960 | Tanaka | 297/347 X |
| 2,924,265 | 2/1960 | Himka | 297/330 |
| 2,929,438 | 3/1960 | Homier | 297/347 X |
| 3,149,815 | 9/1964 | Cotter et al. . | |
| 3,550,953 | 12/1970 | Neale . | |
| 4,556,185 | 12/1985 | Takagi . | |
| 4,589,695 | 5/1986 | Isono . | |
| 4,589,696 | 5/1986 | Kanai et al. . | |
| 4,842,334 | 6/1989 | Voss et al. . | |

FOREIGN PATENT DOCUMENTS

| | | |
|---|---|---|
| 34960 | 9/1981 | European Pat. Off. . |
| 2051127 | 4/1972 | Fed. Rep. of Germany . |
| 2306478 | 8/1974 | Fed. Rep. of Germany . |
| 2441830 | 3/1976 | Fed. Rep. of Germany . |
| 2851565 | 6/1980 | Fed. Rep. of Germany . |
| 3027560 | 2/1982 | Fed. Rep. of Germany . |
| 3046886 | 6/1982 | Fed. Rep. of Germany . |
| 2953871 | 1/1983 | Fed. Rep. of Germany . |
| 3115269 | 6/1985 | Fed. Rep. of Germany . |
| 152630 | 9/1983 | Japan ................................ 297/330 |
| 59-11929 | 1/1984 | Japan . |
| 60-12113 | 6/1985 | Japan . |

Primary Examiner—Peter R. Brown
Attorney, Agent, or Firm—Wigman & Cohen

[57] ABSTRACT

A vehicle seat which is adjustable both with regard to its height and angle of inclination has front and rear height mechanisms which can be operated independently of one another. Each of the height adjustment mechanisms has at least one lever, which levers are pivotable about an axis running in the lateral direction of the seat. The upholstery support of the seat is supported on support points of these levers, which lie at a distance from their pivot axes. The front and rear height adjustment mechanisms are connected with a coupling drive, which, when the front height adjustment mechanism is activated limits the height adjustment of this front height adjustment mechanism, and when the rear height adjustment mechanism is activated, the height adjustment of the support point thereof is transferred to the support point of the front height adjustment mechanism.

14 Claims, 3 Drawing Sheets

VEHICLE SEAT HAVING A SEAT SURFACE WHICH IS ADJUSTABLE BOTH AS TO HEIGHT AND INCLINATION

This is a continuation of co-pending application Ser. No. 07/337,471 filed on Apr. 13, 1989, now abandoned, which is a division of 07/054,769 filed May 27, 1987 issued as U.S. Pat. No. 4,842,334 on Jun. 27, 1989.

BACKGROUND OF THE INVENTION

The invention relates to a vehicle seat having a seat surface which is adjustable both with regard to its height and angle of inclination, and more particularly to such a vehicle seat having front and rear height mechanisms which can be operated independently of one another.

In known vehicle seats of this type the seat frame is supported, both at the front and rear, on the two slide rails by means of respective height adjustment devices, which engage with the guide rails connected by the vehicle body in such a manner as to be longitudinally adjustable. The two rear height adjustment mechanisms can only be driven in tandem, either manually or with a motor, but are driven independently of the two forward height adjustment mechanisms, which are also driven in tandem, either manually or with a motor. The height adjustment of the seat surface without any change in the angle of inclination therefore requires a simultaneous and corresponding drive of all of the height adjustment mechanisms. This renders both the adjustment of the seat surface and the correction of the inclination, which as a rule is also necessary, more difficult. In addition, the introduction of forces that act on the seat exclusively through the height adjustment mechanisms into the guide rails is disadvantageous. This is particularly true for vehicle seats in which the safety belt is attached to the seat.

OBJECTS AND SUMMARY OF THE INVENTION

The object of the invention is to create a vehicle seat having a seat surface which is adjustable in height and angle of inclination, which has an improved adjustment capability of the seat surface and is also economical, even when designed to handle greater forces.

Briefly described, the aforementioned object is accomplished according to the invention by providing a vehicle seat having a seat frame which can be connected with the vehicle, an upholstery support forming the seat surface and at least one front and one rear adjustment mechanism, each of which can be activated independently of one another, wherein a) each of the height adjustment mechanisms has at least one lever, which levers are pivotable about an axis running in the lateral direction of the seat, b) the upholstery support, which can be adjusted relative to the seat frame, is supported on support points of these levers, which lie at a distance from their pivot axes, and c) the front and rear height adjustment mechanisms are connected with a coupling drive, which, when the front height adjustment mechanism is activated limits the height adjustment to the support point of this front height adjustment mechanism, and when the rear height adjustment mechanism is activated, the height adjustment of the support point thereof is transferred to the support point of the front height adjustment mechanism.

By means of the fact that only the upholstery support of the upholstery forming the seat surface is supported on the height adjustment mechanisms, while the back rest is connected directly with the non-height-adjustable seat frame, only those forces need be transferred through the height adjustment mechanisms which act on the upholstery support of the seat cushion. This fact, together with the design of the height adjustment mechanisms, which is quite simple due to the use of levers, provides an economical overall design. Above all, however, for a height adjustment one need only activate the rear height adjustment mechanisms, because due to the coupling drive it also effects a corresponding height adjustment of the support point of the front height adjustment mechanism. In this simple manner and with the use of levers through the selection of the length of such levers, the height adjustment, i.e., a change in the height of the journal point, can be combined with a change in the inclination of the seat surface in which the height of the journal point is not changed. This type of combined height and inclination adjustment better accommodates anatomical variations than does a pure height adjustment. Due to the independence of the front height adjustment mechanism from the rear height adjustment mechanism, the combined height and inclination adjustment can be superimposed by an additional inclination adjustment of the seat surface, by means of which, for example, an optimal position for the thighs can be obtained. Both the front and rear height adjustment mechanisms can be comprised of two structural units that can only be driven in tandem, so that the two longitudinal sides of the upholstery support of the seat cushion can be supported both at front and rear.

One embodiment of the seat according to the invention especially economical and space-saving. But other designs in accordance with the invention also provide advantageous embodiments. If a threaded spindle is employed, it can be used both for the drive of the rear height adjustment mechanism and for the drive of the front height adjustment mechanism, provided that, a driveable spindle nut is available for each mechanism. An additional embodiment of the threaded spindle according to the invention is particularly advantageous, because then no special measures need be taken in order to compensate for the changing positions of the elements coupled with the spindle.

To be sure that the seat cushion does not move toward or away from the back rest during a height adjustment, one need only provide a guide for the upholstery support. A guide of this type renders a separate mechanism for a longitudinal adjustment of the upholstery support relative to the seat frame superfluous. This guide can take the form of a slotted link. But coupling members can also effect the desired components of movement in the longitudinal direction of the seat.

In addition, the two supported locations can, if necessary, be connected with the upholstery support by means of respective compensation links or a compensation coupling. This is particularly necessary if the support locations have different distances from the associated axes.

To assure that the adjustment path of the rear height adjustment mechanism includes the greatest possible height adjustment range, it is favorable to arrange the support location of the rear height adjustment mechanism so that one support point lies beneath the area of the seat surface supporting the ischium hump of the seat user.

One preferred exemplary embodiment has a threaded spindle. With An additional advantageous embodiment includes the use of swing drives for the activation of the levers. A simple and space-saving design is provided by the use of toothed bars for the drive of a height adjustment mechanism. One preferred embodiment has a deformable, inflatable hollow element as a drive mechanism for the front height adjustment mechanism.

It is preferred that the supporting locations of the lever of the rear height adjustment mechanism be arranged so spatially efficiently that it is located beneath the ischium hump of the seat user.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF THE PREFERRED EMBODIMENTS

Figure 1:
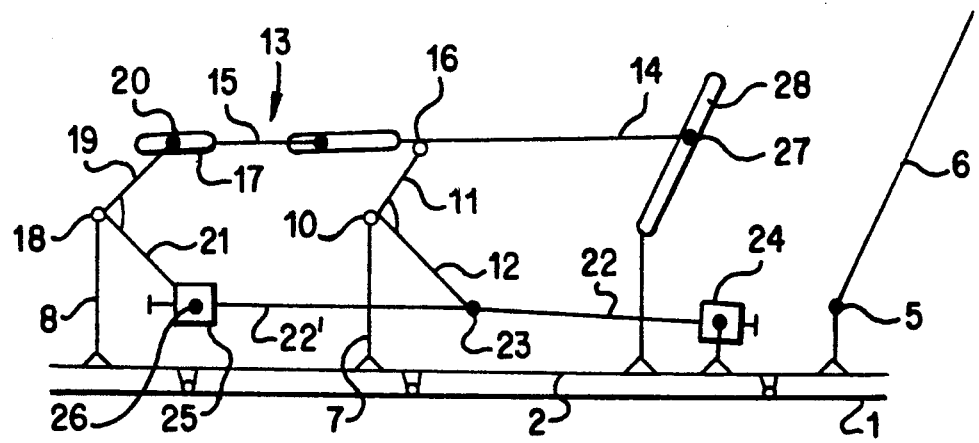
FIG. 1 is a schematic illustration of the supporting elements of a first exemplary embodiment.
Figure 2:
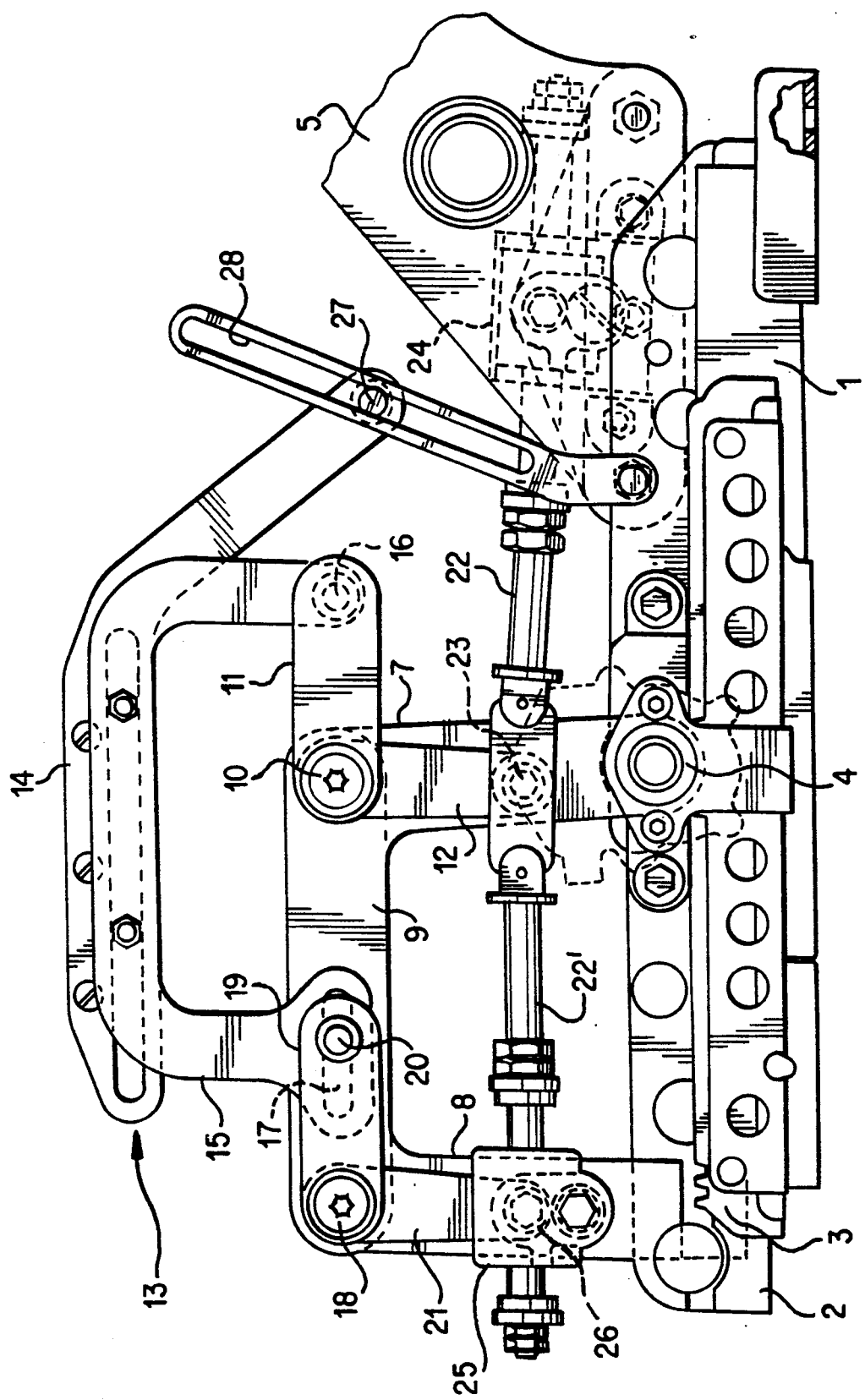
FIG. 2 is a side view of the supporting elements of this exemplary embodiment without the back rest.

Referring now in detail to the drawings, in which like parts are identified by numerals increased by 100 throughout and similar parts are identified by primed numerals, there is illustrated in FIGS. 1 and 2 a vehicle seat construction having respective sliding rails 2 guided so as to be longitudinally movable in two parallel guide rails 1 of known construction which are fixed to the vehicle floor. The sliding rails 2, aside from being longitudinally movable in the guide rails 1, are free of play. For purposes of seat adjustment, one gear of a self-arresting transmission 4 which is rigidly connected with the sliding rail 2 engages with a toothed bar 3 which is rigidly connected with the guide rail 1 and extends in the longitudinal direction thereof. Because not only the two guide rails 1, the two sliding rails 2 in engagement therewith, the two toothed bars 3 and the two drive mechanisms 4 are formed identically, but also the other mechanical elements lying on one side correspond to those on the other side and are not shown in FIGS. 1 and 2, the following statements are also valid for the mechanical elements on the other side of the seat that are not shown in FIGS. 1 and 2.

The two drive mechanisms 4 are connected with each other by means of a torsion-proof shaft. Because in the exemplary embodiment they are driven in tandem by means of a flexible shaft guided to one drive mechanism 4, no manually releasable lock against longitudinal movement of the sliding rails 2 is provided.

Additional elements of a seat frame are attached to the two sliding rails 2, and, apart therefrom, the back rest 6 is also connected thereto by means of respective hinge fittings 5. Forces acting on the back rest 6 are therefore passed directly into the sliding rails 2. The hinge fittings 5, which are formed in a known manner, are motor-driven by means of a flexible shaft in this exemplary embodiment.

On each side the seat frame has a pair of rear supports 7 and a pair of front supports 8. The supports of each of these pairs, which are adjacent to and spaced from each other and extend upwardly from the sliding rails 2 supporting them have, in this exemplary embodiment, the form of flat rails. For reasons of stability it is effective to rigidly connect the upper ends of these supports with each other. As shown in FIG. 2, this connecting portion 9 in the exemplary embodiment is formed by a flat rail which is arranged on its side and lies approximately parallel to the sliding rail 2.

Each of the two rear support pairs 7 carries, at the level of the connecting element 9, a laterally extending, horizontal first pivot axis 10, on which a first pivot lever 11 is rotatably mounted. This first pivot lever 11 forms one shank of a bent lever, which, together with its other shank 12, in this exemplary embodiment encloses a fixed angle of 90 degrees. For reasons of stability, this angle lever is formed of two identical elements which are arranged on the pivot axis 10 in spaced relation to each other. The first pivot lever 11 and the other shank 12 belong to a rear height adjustment mechanism, by means of which it is possible to adjust the height and inclination of the seat surface of the seat cushion (not shown). The seat cushion, which extends in the exemplary embodiment over the entire seat width, but can also lie between two side plate elements which can be adjusted independently from the seat cushion, is supported by an upholstery support 13, of which only a coupling member 14 and a U-shaped support 15 are shown in FIG. 2. One of the two shanks of the support 15 is connected by means of a hinge 16 with the first pivot lever 11 at some distance from the pivot axis 10 thereof. The other shank is provided with a slot 17 running laterally to its longitudinal extension, which slot 17 serves as a compensating link.

Both front support pairs 8 carry, at the level of the connection element 9, respective second pivot axes 18 running parallel to the first pivot axis, and a second pivot lever 19 is pivotably mounted thereon. Spaced from the second pivot axis 18, which is somewhat smaller than the spacing of the hinge 16 from the first pivot axis 10, the second pivot lever 19 supports a pin 20 which passes through the slot 17. The second pivot lever 19 also forms one shank of an angled lever, which, with the other shank 21, encloses an unvariable angle between them, which in the exemplary embodiment is about 90 degrees. In addition, this angle lever is comprised of two identical elements arranged in the longitudinal direction of the second pivot axis 18 in spaced relation to each other.

The second pivot lever 19 and the other shank 21 belong to a front height adjustment mechanism which can be used to change the inclination of the seat surface.

The pivot drive of the first pivot lever 11 is accomplished by means of a first threaded spindle 22, and a second threaded spindle 22' is connected to the front end thereof. Both threaded spindles 22 and 22' do not rotate relative to each other due to a turning knuckle 23 and are connected with the free end of the other pivot lever 12 associated with the first pivot lever 11, whereby the axis of this turning knuckle 23 lies parallel to the first pivot axis 10. The threaded spindle 22 which extends rearwardly from the turning knuckle 23 supports a spindle nut (not shown), which is rotatably mounted in a drive housing 24 which itself is pivotably arranged relative to the sliding rail 2, and which spindle nut is motor-driven in both rotary directions by means of a flexible shaft (not shown). The front threaded spindle 22' also supports a spindle nut which is rotatably mounted in a second drive housing 25. This second drive housing 25 is connected with the free end of the other shank 21 associated with the second pivot lever 19 by means of a turning knuckle 26 in such a manner that it can be moved relative to this shank only about the axis of the turning knuckle 26 lying parallel to the second pivot axis 18. By means of a flexible shaft (not shown), the spindle nut mounted in the second drive housing 25 can be driven in both rotary directions. The spacing of the axis of the turning knuckle 26 from the second pivot axis 18 is equal to the spacing of the axis of the turning knuckle 23 from the first pivot axis 10.

In the pivot position illustrated in FIG. 2, in which both the first pivot lever 11 and the second pivot lever 19 extend horizontally to the rear and the associated other shanks 12 and 21 extend vertically downward, the two height adjustment mechanisms in this exemplary embodiment are in the center positions. The coupling of the two height adjustment mechanisms provided by means of the front threaded spindle 22' has the result that when the first pivot lever 11 is pivoted, the second pivot lever 19 is pivoted in the same direction and to the same degree. This common pivoting movement is effected by the drive of the spindle nut mounted in the first drive housing 24, since in this manner both threaded spindles 22 are moved forward or backward in the longitudinal direction of the seat without themselves rotating. Because the effective length of the first pivot lever 11 is somewhat greater than that of the second pivot lever 19, the height adjustment and the inclination of the seat surface are changed simultaneously.

In this exemplary embodiment this combined height and inclination adjustment is superimposed with a shifting of the seat cushion and its upholstery support 13 in the longitudinal direction of the seat, namely in such a manner that the seat cushion is moved backward during a raising movement and forward during a lowering movement. In this manner it is achieved that the spacing of the seat cushion from the inclined back rest 6 remains essentially unchanged. This is achieved with the aid of the coupling member 14, a pin 27 of which engages in a slotted link 28, which runs approximately parallel to the back rest and is rigidly connected with the sliding rail 2. The necessary compensation movement between the coupling member 14 and the U-shaped support 15 of the upholstery support 13 is made possible by the slot-pin connection between these two elements, as shown in FIG. 2. If this type of compensation movement within the upholstery support 13 is not possible, then, as shown in FIG. 1, the connection between the first pivot lever 11 and the upholstery support 13 must take place by means of a compensating slotted link or a drive which allows for this compensation.

If the spindle nut mounted in the second drive housing 25 is driven, then this drive housing moves in the longitudinal direction of the threaded spindle 22', whose position does not move. Then only the inclination of the upholstery support 13 is changed, for example in order to improve the position of the thighs on the seat cushion.

The hinges 16, which support the rear height adjustment mechanism, are located immediately beneath the ischium hump of the seat user.

Figure 3:
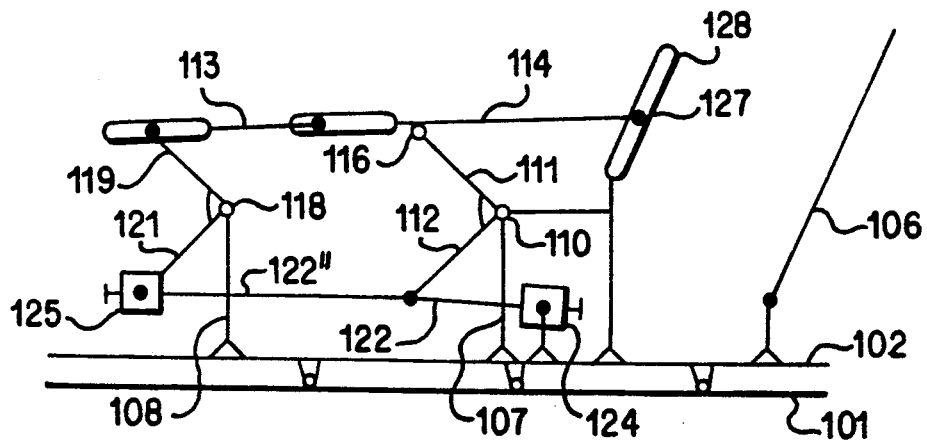
FIG. 3 is a schematically illustrated side view of the supporting elements of a second exemplary embodiment.

The exemplary embodiment illustrated in FIG. 3 differs from that according to FIGS. 1 and 2 only in that both the first pivot lever 111 and the second pivot lever 119 extend forward from their pivot axes 110 and 118. While maintaining the support point 116 of the upholstery support 113 beneath the ischium hump of the seat user, with this embodiment the support pairs 107 and 108, as well as the two height adjustment mechanisms, can be arranged nearer to the back rest 106 to save structural space.

Figure 4:
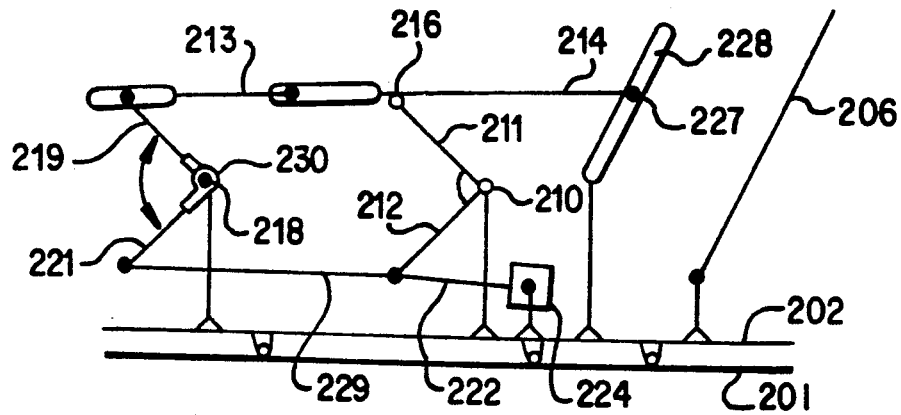
FIG. 4 is a schematically illustrated side view of the supporting elements of a third exemplary embodiment.

The exemplary embodiment illustrated in FIG. 4 differs from that according to FIG. 3 first of all in that both the other shank 212 associated with the first pivot lever 211 and the other shank 221 associated with the second pivot lever 219 are connected with each other by means of a turning knuckle having a coupling member 229 with a fixed length. The threaded spindle 222 thus ends at the shank 212. Therefore a different pivot drive could also be used for the first pivot lever 211 of the rear height adjustment mechanism.

A further difference is found in the fact that the second pivot lever 219 and the other shank 221 associated therewith are connected with each other by means of a swing drive 230, which, for example, can be formed like the common swing drives for back rests. If the angle between the second pivot lever 219 and its other shank 221 is changed, then the inclination position of the upholstery support 213 also changes, while a longitudinal movement of the threaded spindle 222 results in a height adjustment which is superimposed over an inclination change if the effective length of the first pivot lever 211 differs from that of the second pivot lever 219.

Figure 5:
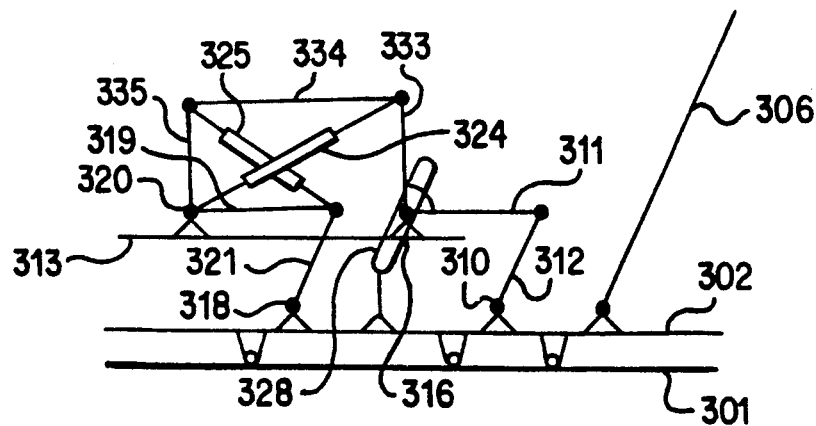
FIG. 5 is a schematically illustrated side view of the supporting elements of a fourth exemplary embodiment.

The slotted link 228 effects a longitudinal movement of the upholstery support 213 during a height adjustment. Neither the drive housing 224, through which the threaded spindle 222 passes, nor the swing drive 230 experiences any longitudinal movement during a seat adjustment, so that when driven by flexible shafts, they experience no change of position. Of course, with this exemplary embodiment the first pivot lever 211 and the second pivot lever 219, together with their other shanks, could also point backward, as is the case in the exemplary embodiment according to FIGS. 1 and 2. As shown in FIG. 5, in this fourth exemplary embodiment not just the second pivot lever 319 is pivotably connected with its other shank 321. A corresponding hinge also connects the first pivot lever 311 with its other shank 312. Differing from the above-described exemplary embodiments, here the free end of both the shank 312 associated with the first pivot lever 311 and the free end of the shank 321 associated with the second pivot lever 319 are connected with the sliding rail 302 by means of a hinge.

The support points 316 and 320 of the first pivot lever 311 and the second pivot lever 319 are, as in the above-described exemplary embodiments, connected with each other by means of a lever drive, but are also hinged to the upholstery support 313 for the seat cushion. The lever drive in this exemplary embodiment consists of three levers 333, 334 and 335. These three levers are interconnected by means of respective turning knuckles. An additional turning knuckle represents the connection between the lever 335 and the second pivot lever 319. In contrast, the lever 333 is connected with the first pivot lever 311 so as to rotate therewith.

In order to superimpose a longitudinal movement of the upholstery support of the seat cushion over the height adjustment movement, the support point 316 is guided in a slotted link 328 which runs at least approximately parallel to the back rest 306.

The support point 320 is connected with the hinge connecting the levers 333 and 334 by means of a variable-length adjustment element 324 to provide a means for a combined height and inclination adjustment.

Instead of the adjustment element 324, the hinge connecting the levers 334 and 335 could be replaced by a swing drive. However, the adjustment element 324 can also be provided between the support point 316 and the hinge connecting the levers 334 and 335, or instead, the hinge connecting the levers 333 and 334 could be replaced by a swing drive. In addition, it would be possible to provide an adjustment mechanism instead of the adjustment element 324, with which the angle between the upholstery support 313 and the pivot lever 311 or the lever 333 can be altered.

In this exemplary embodiment, aside from the slotted link 328, only turning knuckles are necessary. In addition, a pipe or the like can be provided at the support point 316 which would prevent the seat user from sinking too deeply into the seat cushion in case of a crash. The slotted link 328 can also be designed in such a manner that it prevents this type of deep sinking.

Figure 6:
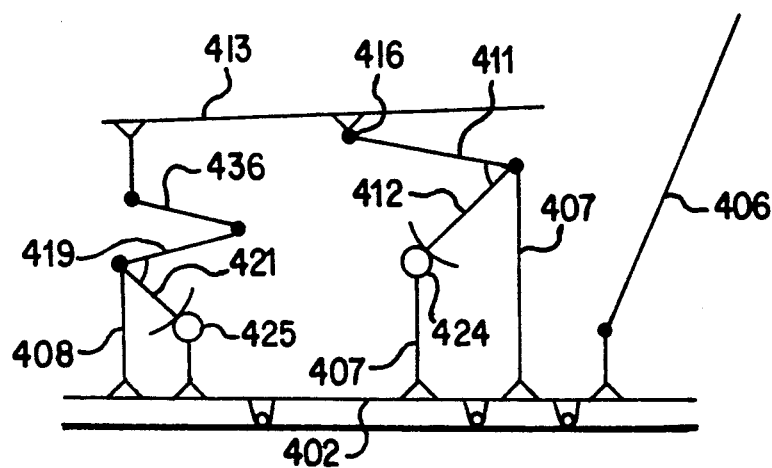
FIG. 6 is a schematically illustrated side view of the supporting elements of a fifth exemplary embodiment.

In the exemplary embodiment illustrated in FIG. 6, the forward-pointing first pivot lever 411 is pivotably mounted on the rear support pair 407 and the backward-pointing second pivot lever 419 is pivotably mounted on the front support pair 408 in the above-described manner. One difference relative to the exemplary embodiments according to FIGS. 1 through 4 is that the front support pair 408 is made shorter than the rear support pair 407, which, however, is not significant for the manner of functioning. The other shank 412 which is connected with the first pivot lever 411 so as to rotate therewith is formed as a toothed segment which engages with a gear that is rotatably mounted with a first drive housing 424 rigidly connected in the sliding rail 402. The power for this drive is transmitted in this exemplary embodiment by means of a flexible shaft. The other shank 421 connected with the second pivot lever 419 so as to rotate therewith is formed as a toothed segment. The gear engaging therewith is rotatably mounted in a second drive housing 425 which is rigidly connected with the sliding rail 402. A turning knuckle 416 arranged beneath the ischium hump of a seat user connects the first pivot lever 411 with the upholstery support 413 of the seat cushion. The support point of the second pivot lever 419 is connected with one end of a coupling lever 436 by means of a turning knuckle. The other end of this coupling lever 436 is hingedly connected to the upholstery support 413 at a distance in front of the turning knuckle 416 and at a deeper level.

Figure 7:
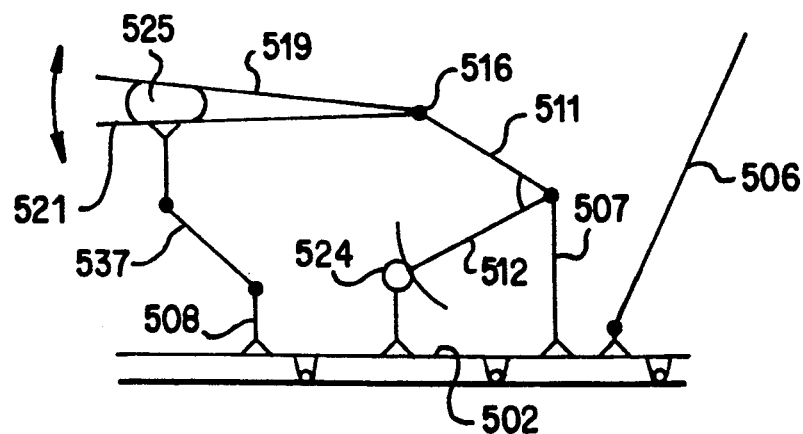
FIG. 7 is a schematically illustrated side view of the supporting elements of a sixth exemplary embodiment.

In the exemplary embodiment illustrated in FIG. 7, the first pivot lever 511, its mounting on the rear support pair 507 and its pivot drive by means of the other shank 512 connected therewith so as to rotate therewith, as well as the drive in the first drive housing 524 rigidly connected with the sliding rail 502, are formed as in the exemplary embodiment according to FIG. 6. Similarly, the support point of the first pivot lever 511 is connected with the upholstery support by means of a turning knuckle 516, which upholstery support, however, simultaneously forms the second pivot lever 519, are also formed as in FIG. 6. The pivot drive of the first pivot lever 511 could, of course, also be formed in a different manner, e.g., as a threaded spindle or as a swing drive.

The second pivot lever 519 is pivotably connected with its other shank 521 by means of the turning knuckle 516. The other shank 521 extends forward, as does the second pivot lever 519, to form a forwardly open angle. A deformable, inflatable hollow element 525 is arranged between the second pivot lever 519 and its other shank 521, namely in spaced relation from the turning knuckle 516, as a pivot drive means for the second pivot lever 519. For example, the hollow element 525 can be an inflatable cushion made from rubber or plastic.

The other shank 521 of the second pivot lever 519 is supported on the sliding rail 502 by means of the front support pair 508, which is rigidly connected with the sliding rail 502, and by means of a support lever 537 which is mounted on this support pair so as to rotate about an axis lying parallel to the pivot axes of the pivot levers, whereby in this exemplary embodiment the connecting point lies at a distance beneath the hollow element 525, between the support lever 537 and the other shank 521.

In this exemplary embodiment as well, a pivoting of the first pivot lever 511 results not only in a height adjustment, in which the support lever 537 experiences a pivoting movement, but also an inclination adjustment and a movement in the longitudinal direction of the seat relative to the back rest 506. In contrast, a pivoting of the second pivot lever 519 changes only the inclination position of the seat surface of the seat cushion.

It is advantageous in this embodiment, that few mounting points are required, spatial requirements are low, no slotted links are necessary, only rotating hinges are required and both seat sides can be driven without difficulty.

Although only preferred embodiments are specifically illustrated and described herein, it will be appreciated that many modifications and variations of the present invention are possible in light of the above teachings and within the purview of the appended claims without departing from the spirit and intended scope of the invention.

What we claim is:

1. Vehicle seat in which the inclination of the back rest and the inclination and height of the seat surface are adjustable, having:
   (a) an upholstery support for the upholstery forming the seat surface, in which the height and inclination of the upholstery support are adjustable relative to a seat support means that is connected with the vehicle,
   (b) a rear height adjustment device supported by the seat support means and supporting a rear part of the upholstery support, said rear height adjustment device comprising a first angled lever having upper and lower ends which, at an intermediate point, is pivotally connected to and which can be pivoted about a first axle supported on the seat support means and running in the lateral direction of the seat, (c) a front height adjustment device supported by the seat support means and supporting a front part of the upholstery support, said front height adjustment device comprising a second angled lever having upper and lower ends which, at an intermediate point, is pivotally connected to and which can be pivoted about a second axle supported on the seat support means and running in the lateral direction of the seat, said front and rear parts of said upholstery support being pivotally supported by said upper ends of said second and first levers, respectively, (d) a first drive mechanism coupled to said rear height adjustment device at said first lever lower end by a first spindle and first turning knuckle, and coupled to said front height adjustment device at said second lever lower end by a second spindle and second turning knuckle disposed between said first and second lever lower ends, said first drive mechanism activating said rear and front height adjustment devices together, (e) a second drive mechanism coupled to said front height adjustment device at said second lever lower end and coupled to said rear height adjustment device at said first lever lower end by said second spindle and said first turning knuckle, said second drive mechanism activating only said front height adjustment device, and (f) a guide provided for the upholstery support, said guide being connected to the seat support means, said guide extending in a direction inclined backwardly with respect to a vertical direction, and means are provided interconnecting said guide and said upholstery support, wherein said guide, in cooperation with said interconnecting means, superimposes a backwards movement of the upholstery support over the vertical adjustment when the upholstery support is moved upward and superimposes a forward movement over the vertical adjustment when the upholstery support is moved downward.

2. Vehicle seat according to claim 1, characterized in that the guide is formed by a slotted link which is rigidly connected with the seat support means and said interconnecting means comprises a sliding element guided in said slot of said link.

3. Vehicle seat according to claim 1, characterized in that one of two support points, at which the upholstery support is supported on the height adjustment devices, is connected with the other support point and with the upholstery support by means of a slotted connection which is oriented relative to said upholstery support and said front height adjustment device to serve as a compensating link between said front and rear height adjustment devices.

4. Vehicle seat according to claim 1, wherein said upholstery support is supported on said front and rear adjustment devices at two support points, characterized in that one support point lies beneath the area of the seat portion that supports the ischium hump.

5. Vehicle seat according to claim 1, wherein each of the first and second levers of the height adjustment devices includes a respective first and second support point for the support of the upholstery support, characterized in that the two lower ends of each of the first and second height adjustment levers coupled with the threaded spindle have the same length, and the first support point of the first lever of the rear height adjustment device has a greater distance from the first axle thereof than does the second support point of the second lever of the front height adjustment device from the second axle thereof, whereby different height adjustments can be made in the front and rear parts of the upholstery support for the same pivot angles of both levers.

6. Vehicle seat according to claim 5, characterized in that one support point is connected with a connecting element that extends from one support point to the other, the other support point is connected with said connecting element by means of a slotted link formed in said connecting element, and a pin is provided which connects said connecting element and said other support point and is movable along the slot of said link.

7. Vehicle seat according to claim 5, wherein the lower end of the angular lever of the rear height adjustment device is coupled to the spindle at a coupling point, characterized in that the threaded spindle is divided at the coupling point of the first lever lower end of the rear height adjustment device into two divided portions, and both of said divided portions are hingedly connected with each other at said coupling point of the first lever lower end of the rear height adjustment device by means of an axle running in the lateral direction of the seat.

8. Vehicle seat, in which the angle of the back rest is adjustable and in which the height and inclination of the seat position are adjustable, having:

(a) an upholstery support for the upholstery forming the seat surface, in which the height and inclination of the upholstery support are adjustable relative to a seat support means that is connected with the vehicle;

(b) a rear height adjustment device supported by the seat support means and supporting a rear part of the upholstery support, said rear height adjustment device comprising a first angled lever having upper and lower ends which, at an intermediate point, is pivotally connected to and which can be pivoted about a first axle supported on the seat support means and running in the lateral direction of the seat, (c) a front height adjustment device supported by the seat support means and supporting a front part of the upholstery support, said front height adjustment device comprising a second angled lever having upper and lower ends which, at an intermediate point, is pivotally connected to and which can be pivoted about a second axle supported on the seat support means and running in the lateral direction of the seat, said front and rear parts of said upholstery support being pivotally supported by said upper ends of said second and first levers, respectively, (d) a first drive mechanism coupled to said rear height adjustment device at said first lever lower end by a first portion of a threaded spindle, and coupled to said front height adjustment device at said second lever lower end by a second portion of said threaded spindle, disposed between said first and second lever lower ends, said first drive mechanism activating said rear and front height adjustment devices together, (e) a second drive mechanism coupled to said front height adjustment device at said second lever lower end and coupled to operably mounted to said second portion of said threaded spindle, said second drive mechanism activating only said front height adjustment device, and, (f) wherein said threaded spindle
(i) is connected both with the lower end of the lever of the front and the lower end of the lever of the rear height adjustment devices so as to pivot the levers about their respective axles running in the lateral direction of the seat when the first drive mechanism is activated, and
(ii) the threaded spindle is divided at its connection point with the first lever lower end to form two divided portions, and the two divided portions are pivotably connected with each other so as to pivot about an axle running in the lateral direction of the seat.

9. Vehicle seat according to claim 8 wherein the second lever lower end is hingedly connected with the second driven mechanism.

10. Vehicle seat according to claim 8, wherein said upholstery support is supported on said front and rear adjustment devices at two support points, characterized in that the first and second lever lower ends coupled with the threaded spindle have the same length, and the support point of the upholstery support on the first angled lever has a greater distance from the first axle than does the support point of the second angled lever from its second axle whereby different height adjustments can be made in the front and rear parts of the upholstery support for the same pivot angles of both levers.

11. Vehicle seat according to claim 8, characterized in that a guide is provided for the upholstery support on the seat support means, said guide extending in a direction inclined backwardly with respect to a vertical direction, and means are provided interconnecting said guide and said upholstery support, wherein said guide, in cooperation with said interconnecting means, when the upholstery support is moved upward, superimposes a backwards movement on the vertical adjustment motion, and when the upholstery support is moved downward superimposes a forward movement on the vertical adjustment motion.

12. Vehicle seat according to claim 11, characterized in that the guide is formed by a slotted link that is rigidly connected with the seat support means, and said interconnecting means comprises a sliding element guided in said slot of said link.

13. Vehicle seat according to claim 8, wherein said upholstery support is supported on said front and rear height adjustment devices at two support points, characterized in that at least one of the two support points, on which the upholstery support rests on the height adjustment devices, is connected with the upholstery support by means of a slotted connection which is oriented relative to said upholstery support and said front height adjustment device to serve as a compensating link between said front and rear height adjustment devices.

14. Vehicle seat according to claim 8, wherein said upholstery support is supported on said front and rear adjustment devices at two support points, characterized in that one of the support points on which the upholstery support rests, lies beneath the area of the seat surface that supports the ischium hump.

* * * * *

UNITED STATES PATENT AND TRADEMARK OFFICE
CERTIFICATE OF CORRECTION

PATENT NO. : 5,143,421
DATED : September 1, 1992
INVENTOR(S) : Hans W. VOSS et al It is certified that error appears in the above-indentified patent and that said Letters Patent is hereby corrected as shown below:

Column 2, line 37, before "especially" insert --is--;

Column 3, line 4, delete "With".

Column 10, claim 8, line 67, delete "coupled to".

Column 11, claim 9, line 18, "driven" should be --drive--.

Signed and Sealed this

Twelfth Day of October, 1993

Attest:

BRUCE LEHMAN

Attesting Officer

Commissioner of Patents and Trademarks